United States Patent
Challa et al.

(10) Patent No.: US 6,796,577 B2
(45) Date of Patent: Sep. 28, 2004

(54) AIR-BAG ARRANGEMENT

(75) Inventors: Venkata Challa, Windsor (CA); Simon Valkenburg, Windsor (CA); David Stow, Windsor (CA); Olivier Bastien, Congleton (GB)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 10/205,496

(22) Filed: Jul. 26, 2002

(65) Prior Publication Data

US 2003/0052477 A1 Mar. 20, 2003

(30) Foreign Application Priority Data

Jul. 26, 2001 (GB) .............................................. 0118239

(51) Int. Cl.⁷ ............................................. B60R 21/22
(52) U.S. Cl. ................................................... 280/730.2
(58) Field of Search ........................ 280/730.2, 730.1, 280/729, 728.1, 749

(56) References Cited

U.S. PATENT DOCUMENTS 2,706,819 A  *  4/1955  McClure et al. ................. 5/94
5,439,247 A     8/1995  Kolb
6,129,377 A  * 10/2000  Okumura et al. ......... 280/730.2
6,299,199 B1 * 10/2001  Bowers et al. ........... 280/730.2
6,431,587 B1 *  8/2002  O'Docherty ............. 280/730.2
6,505,853 B2 *  1/2003  Brannon et al. ......... 280/730.2
6,561,541 B2 *  5/2003  Vendely et al. .......... 280/730.2
6,616,178 B1 *  9/2003  Nanbu ..................... 280/730.2
6,619,690 B2 *  9/2003  Tanase et al. ............ 280/730.2

FOREIGN PATENT DOCUMENTS

| EP | 0878363 A1 | 11/1998 |
| GB | 2297950 A | 8/1996 |
| GB | 2327066 A | 1/1999 |

* cited by examiner

*Primary Examiner*—Thomas Price
(74) *Attorney, Agent, or Firm*—Venable LLP; Robert Kinberg

(57) ABSTRACT

An air-bag in the form of an inflatable curtain has a plurality of zones each provided with vertically extending cells defined by seams. Uninflatable regions are provided, the uninflatable regions being provided with oval apertures. On deployment of the inflatable curtain, the oval apertures will distend to become circular, enabling the uninflated region effectively to stretch to moderate the tension generated between two anchoring points connected by straps to the lower edge of the air-bag.

12 Claims, 2 Drawing Sheets

AIR-BAG ARRANGEMENT

CROSS REFERENCE TO RELATED APPLICATION

This application claims the priority of British Application No. 0118239.3 filed Jul. 26, 2001, the disclosure of which is being incorporated herein by reference.

BACKGROUND OF THE INVENTION

The present invention relates to an air-bag arrangement, and more particularly relates to an air-bag arrangement for use in a motor vehicle in the form of a so-called "inflatable curtain".

An inflatable curtain is an air-bag or inflatable element which is initially mounted in the roof of a motor vehicle adjacent the side windows of the vehicle. In the event of a specific type of accident, such as, for example, a side impact, the inflatable element inflates, thus extending down to cover the windows in the manner of a curtain. Typically the opposed ends of the lower edge of the inflatable element are secured to mounting points, optionally with the use of straps, and, as the inflatable element inflates, so the length of the lower edge of the inflatable element reduces, thus creating a line of tension extending between the two anchoring points. Thus the inflatable element is held securely in position, minimising the risk of any part of an occupant emerging through a window during the accident.

It has been proposed to provide certain regions of the inflatable element which do not actually inflate in order to minimise the quantity of gas needed to inflate the inflatable element, and also to ensure that the inflatable element can be inflated in the relatively brief period of time that is typically available in a side impact situation.

While many designs of inflatable curtain have been produced in recent years for use in different types of motor vehicle. It has been found, especially in connection with inflatable elements designed for use in vehicles having a substantial length, such as vehicles of "MPV" type, where the inflatable element can extend from an "A"-Post to a "D"-Post that, excessive tension can occur in the lower edge of the inflatable curtain, thus distorting the inflatable curtain in an undesirable manner.

SUMMARY OF THE INVENTION

The present invention seeks to provide an improved air-bag arrangement.

According to this invention there is provided an air-bag arrangement in the form of an inflatable curtain adapted to be mounted in a motor vehicle and adapted, when inflated, to extend adjacent the side windows of the motor vehicle, the air-bag arrangement including an inflatable element having an upper edge provided with means to mount the upper edge to the roof of a motor vehicle, and an opposed lower edge, the opposed ends of the lower edge being provided with means to connect the said opposed ends to anchoring points within a motor vehicle, the lower edge of the inflatable element having between the anchoring points at least one inflatable region and at least one uninflatable region, the uninflatable region being provided with one or more apertures therein, the arrangement being such that, on inflation of the inflatable element, the width of the or each aperture will increase to moderate the tension generated between the said anchoring points by the inflation of the inflatable region.

Preferably there are at least two inflatable regions separated by a said uninflatable region.

Conveniently a gas flow duct is defined adjacent the upper edge of the inflatable element, and the gas flow duct communicates with the inflatable regions, each of which extends from the gas flow duct towards the lower edge of the inflatable element, at least one inflatable region being divided into a plurality of inflatable cells by means of seams provided within each inflatable region.

In one embodiment of the invention the inflatable element has three inflatable regions, and two uninflatable regions which separate the three inflatable regions, each of the uninflatable regions being provided with said apertures.

In a further embodiment of the invention the inflatable element has an uninflatable region located between an inflatable part of the lower edge and at least one of the anchoring points.

Conveniently respective uninflatable regions are located between a main part of the lower edge and each of the two anchoring points.

Preferably the or each uninflatable region is provided with a plurality of apertures.

Conveniently the plurality of apertures are provided in a plurality of rows of apertures, at least one row of apertures extending adjacent and parallel with the lower edge of the inflatable element, and another row of apertures extending at a location between the lower-most row of apertures and the upper edge of the inflatable element.

Advantageously the number of apertures present in the lower row of apertures is greater than the number of apertures present in the upper row of apertures.

The apertures may be oval apertures or may be zig-zag apertures.

The invention also relates to a method of making the inflatable element as described above in which the method comprises the steps of using a one-piece weaving process to fabricate the inflatable curtain, and a laser cutting process to cut the or each aperture.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
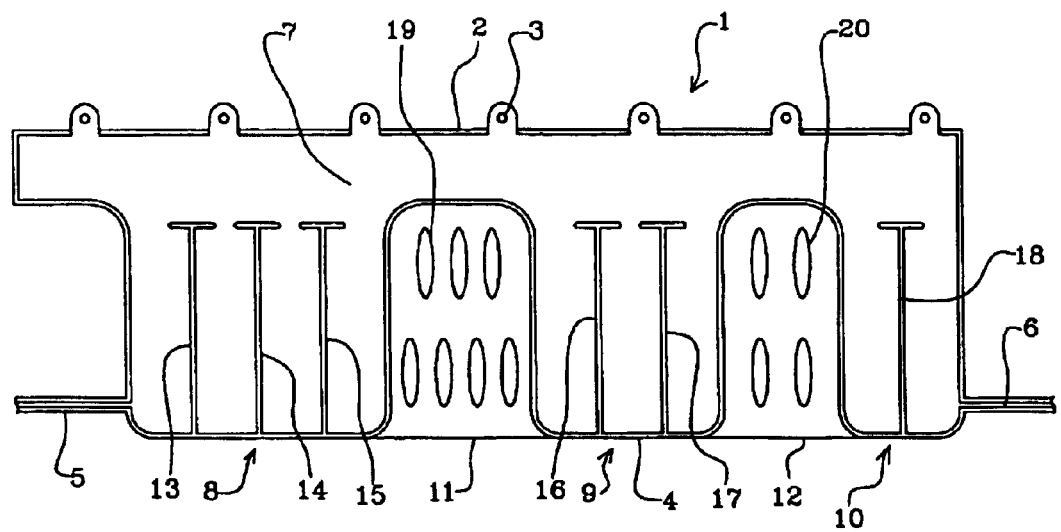
FIG. 1 is a side view of an inflatable element, or inflatable curtain, forming an air-bag arrangement in accordance with the invention, in the uninflated state.

Referring initially to FIG. 1 of the accompanying drawings, an inflatable element or air-bag 1, in the form of an inflatable curtain, is shown in the uninflated state. The air-bag 1 is formed using a one-piece weaving technique. As will become clear from the following description, the inflatable element has regions where the inflatable curtain has two super-imposed adjacent layers of fabric forming a front face and a rear face, and regions where there is only a single layer or web of fabric.

The illustrated inflatable element 1 is of generally rectangular form having an upper edge 2 provided with a plurality of mounting lugs 3 to facilitate the mounting of the inflatable element in position in a motor vehicle. The inflatable element defines a lower edge 4. Extending from each end of the lower edge 4 is a respective mounting strap 5, 6. Each strap 5, 6 extends to an appropriate mounting point in a motor vehicle.

The upper part of the inflatable element, adjacent the upper edge 2, is formed from two adjacent sheets of fabric which define a gas flow duct 7. The gas flow duct 7 communicates with a short extension provided adjacent the upper edge 2 of the inflatable element 1, which extends to a suitable gas generator or inflator.

In the illustrated embodiment three inflatable regions 8, 9 and 10 are provided, in which there are two adjacent layers of fabric. Each region 8, 9 or 10 extends from the gas duct 7 downwardly towards the lower edge 4 of the inflatable element 1. The inflatable regions 8, 9 and 10 are separated by two uninflatable regions 11, 12, each of rectangular form. Each uninflatable region 11, 12 is formed of a single web of fabric.

The inflatable region 8 is formed from two super-imposed adjacent layers of fabric which form the front face and the back face of the inflatable element, and in this embodiment the inflatable region 8 is divided into a plurality of substantially vertically extending chambers by means of substantially vertically extending seams 13, 14, 15. Each seam extends upwardly from the lower edge 4 of the inflatable element, and terminates adjacent the gas flow duct 7.

Similar seams 16 and 17 are provided in the inflatable region 9, and a single corresponding seam 18 is provided within the inflatable region 10.

A plurality of oval apertures 19 are provided in the uninflatable region 11. In this embodiment the apertures are cut using a laser cutting technique. Each aperture is of oval form and has a greater height than width. The apertures are present in two rows of apertures, there being three apertures provided in the upper row which is adjacent the gas duct 7, and four apertures provided in a lower row which is located adjacent the lower edge 4 of the inflatable element. Similar oval apertures 20 are provided in the web 12, with two apertures in an upper row, and two apertures in a lower row.

The inflatable element will be mounted in position in the roof of a motor vehicle, such as a Multi-Purpose Vehicle or MPV, extending over the side doors and windows, with the mounting lugs 3 connected to mounting points in the roof and the straps are connected to anchoring points on the "A"-Post and the "D"-Post of the vehicle in this example.

Figure 2:
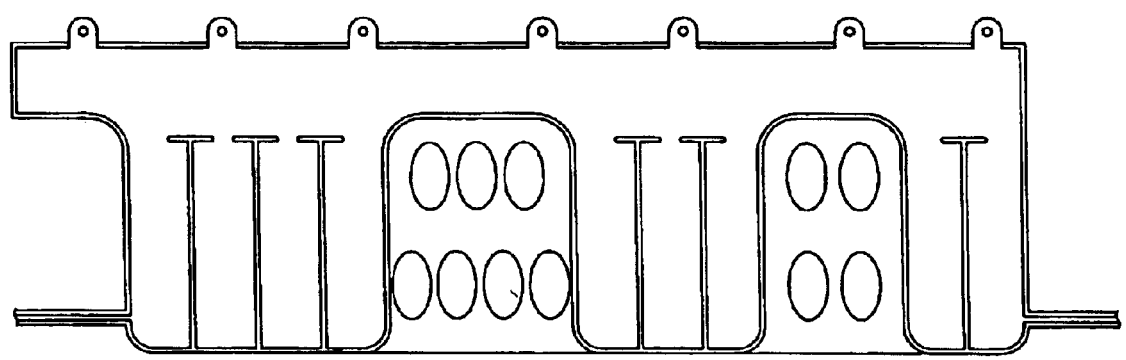
FIG. 2 is a corresponding view of the inflatable element of FIG. 1 when in the inflated state.

On deployment of the inflatable element as shown in FIG. 1, gas is supplied from the inflator and flows through the gas flow duct 7, thus inflating the inflatable regions 8, 9 and 10, with gas filling the chambers defined by the seams 13 to 18. The axes of the chambers intersect the lower edge 4 of the inflatable curtain and, as the cells inflate, the length of the lower edge reduces. Thus tension is created between the anchoring points to which the straps 5 and 6 are connected. As the tension increases, so the apertures 19 and 20 deform and become, as shown in FIG. 2, of circular form.

As the apertures 19 and 20 deform, the width of each aperture increases, and this enables the effective width of the uninflatable webs 11 and 12 to increase slightly, thus balancing, to a predetermined extent, the tensioning effect provided by the inflation of the cells within the inflatable regions 8, 9 and 10. Thus a desired degree of tension is provided at the lower edge of the inflatable element, helping ensure that the inflatable regions of the inflatable element are in the desired position.

It is preferred for there to be more apertures in the row of apertures provided adjacent the lower-most edge of the inflatable element than in the row of apertures provided adjacent the gas flow duct, since a greater tensioning effect is experienced in this region of the inflatable element as it is deployed.

Figure 3:
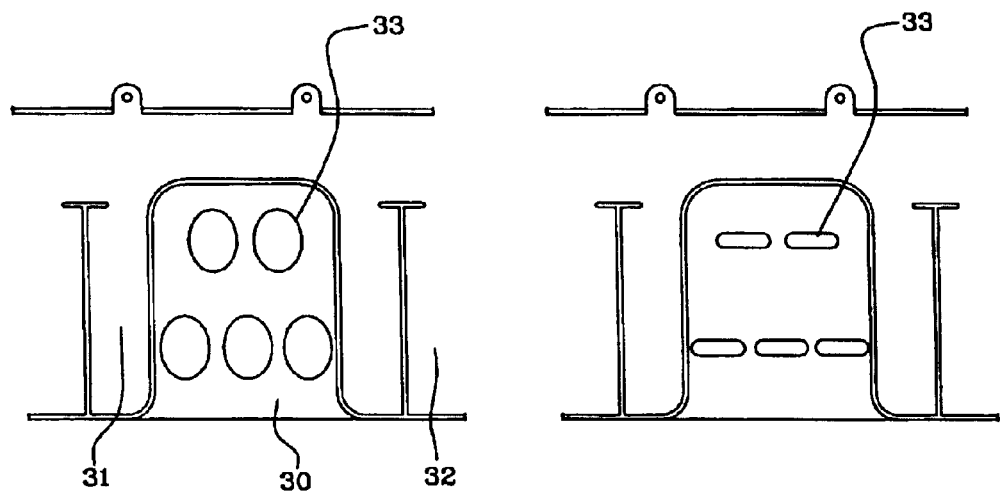
FIG. 3 is an enlarged view of part of a modified embodiment of the invention in the uninflated state.
Figure 4:
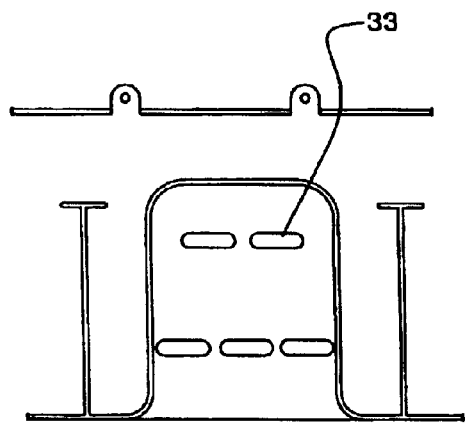
FIG. 4 is a view of the part of the inflatable element shown in FIG. 3, when the inflatable element is in an inflated state.

FIG. 3 illustrates part of an uninflated region 30 of a modified form of inflatable element, which is located between a first inflatable region 31, and a second inflatable region 32. The uninflatable region 30 is provided with circular apertures which are laser cut in the inflated region, the circular apertures 33 being present in the form of two rows, one row of apertures being located adjacent the gas flow duct, and the other row of three apertures being located adjacent the lower-most edge of the inflatable element. On inflation of the inflatable element, as shown in FIG. 4, the circular apertures 33 distort to become oval apertures, and thus the width of each aperture has increased. Again the apertures serve to moderate the tensioning effect provided by the inflation of the inflatable regions of the inflatable element.

It is to be understood that apertures of other shapes may be used.

Whilst the invention has been described above with reference to an inflatable curtain having three inflatable regions, it is to be appreciated that the invention may find application in any inflatable curtain having two or more inflatable regions in which the inflatable regions are separated by uninflatable regions, with one or more of those regions being apertured.

Figure 5:
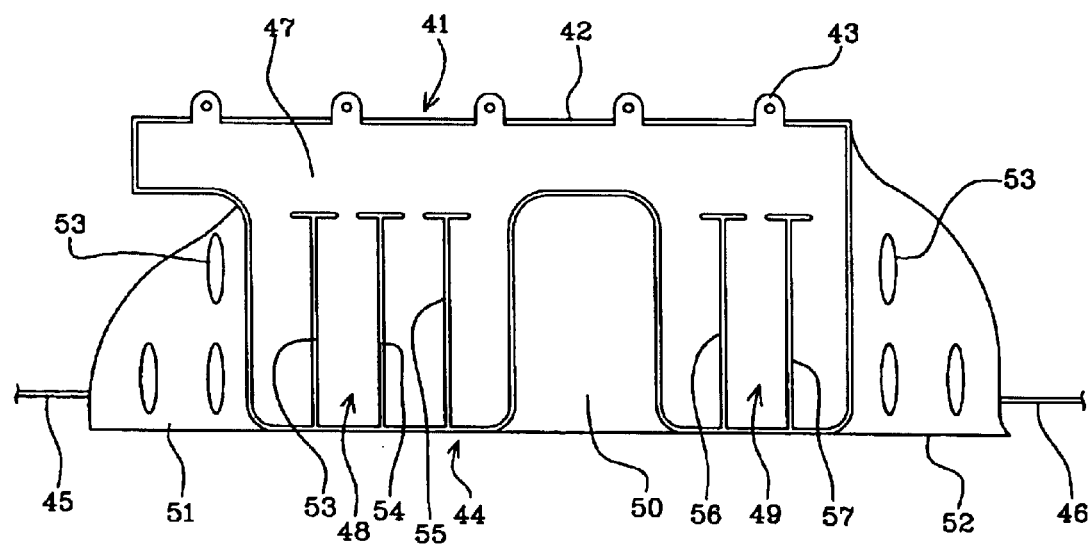
FIG. 5 is a view, corresponding to FIG. 1, of a further embodiment of the invention.

Referring now to FIG. 5 of the accompanying drawings, in a modified embodiment of the invention an inflatable element or air-bag 41 is again formed using a one-piece weaving technique and, in many respects, is similar to the inflatable element 1 of FIG. 1.

The inflatable element 41 is of generally rectangular shape, and has an upper edge 42 provided with a plurality of mounting lugs 43 to facilitate the mounting of the inflatable element 41 in position within a motor vehicle. The inflatable element defines a lower edge 44.

Extending from each end of the lower edge 44 is a respective mounting strap 45, 46. Each strap 45, 46 extends to an appropriate mounting point in a motor vehicle.

The upper part of the inflatable element 41, adjacent the upper edge 42, is formed from two adjacent sheets of fabric which define a gas flow duct 47. The gas flow duct 47 is provided with a short extension which extends beyond the side edge of the inflatable lenient 41 to a suitable gas generator or inflator.

In the illustrated embodiment two spaced apart inflatable regions 48 and 49 are provided, in which there are two adjacent layers of fabric. Each region 48 or 49 extends from the gas duct 47 downwardly towards the lower edge 44 of the inflatable element 41. The inflatable regions 48 and 49 are separated by one uninflatable region 50 of rectangular form. The uninflatable region 50 is formed from a single web of fabric, and is not apertured in this particular embodiment.

Provided between the inflatable region 48 and the strap 45 is a first triangular uninflatable region 51. Provided between the inflatable region 49 and the strap 46 is a second substantially triangular uninflatable region 52. In the illustrated embodiment the uninflatable regions 51 and 52 are provided with apertures 53 therein, the apertures being shown as being generally oval. The inflatable element of FIG. 5 is shown in the uninflated form.

The inflatable region 48 is formed from two superimposed adjacent layers of fabric which form the front face and the back face of the inflatable element, and in this embodiment the inflatable region 48 is divided into a plurality of substantially vertically extending chambers by means of substantially vertically extending seams 53, 54, 55. Each seam extends upwardly from the lower edge 44 of the inflatable element and terminates adjacent the gas flow duct 47.

Similar seams 56, 57 are provided in the inflatable region 49. The chambers defined by the seams extend perpendicularly to the lower edge of the inflatable element, although in modified embodiments the chambers could extend at an angle of inclination to the lower edge.

In the embodiment of FIG. 5 the apertures 53 are provided in the uninflatable regions 51, 52 using a laser cutting technique.

The inflatable element 41 will be mounted in position in a manner similar to that described above with reference to the embodiment of FIGS. 1 and 2.

On deployment of the inflatable element 41 as shown in FIG. 5, the inflatable regions 48 and 49 will become inflated with gas, and the chambers defined by the seams 53–57 will become inflated, with the length of the lower edge of the inflatable element consequently reducing. Thus tension will be created between the anchoring points to which the straps 45 and 46 are connected, and as the tension increases so the apertures 53 in the uninflatable triangular regions 51, 52 will deform to become of circular form. Consequently the desired degree of tension is provided at the lower edge of the inflatable element 41.

In an illustrated embodiment shown in FIG. 5 of the uninflatable region 50 located between the two inflatable regions 48 and 49 is not apertured in any way but, in a modified embodiment, this region, too, could be apertured.

Figure 6:
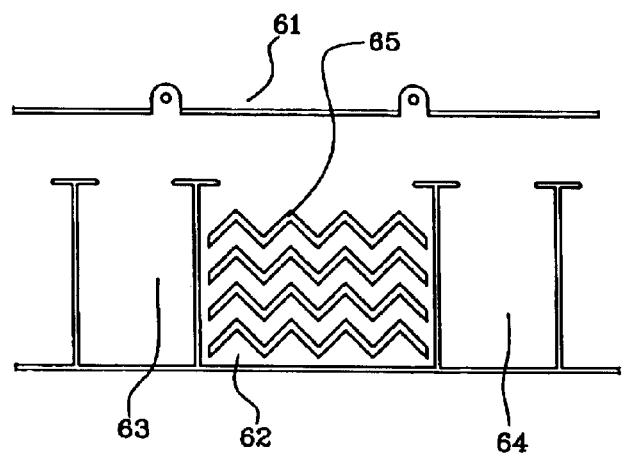
FIG. 6 is a view, corresponding to FIGS. 3 and 4, of yet another embodiment of the invention.

Whilst the apertures shown in the embodiments of FIGS. 1 to 5 have all been oval apertures, it is to be envisaged that apertures of a different form may be utilised. FIG. 6 is a view corresponding to FIGS. 3 and 4 showing part of the inflatable element 61. FIG. 6 illustrates an uninflatable region 62 of the inflatable element 61. The uninflatable region 62 is located between the first inflatable region 63 and the second inflatable region 64. The uninflatable region 62 is provided with apertures 65 of a zig-zag form. The apertures extend in parallelism. The uppermost aperture is located adjacent the gas flow duct which supplies gas to the inflatable regions 63 and 64, and the next adjacent aperture is parallel with the uppermost aperture, and so on. It will be appreciated that the zig-zag apertures 65 will effectively extend in length on deployment of the inflatable element to moderate the tensioning effect provided by the inflation of the inflatable regions 63, 64 of the inflatable element 61.

Whilst the invention has been described, with reference to embodiments in which each of the uninflatable regions of the inflatable element are provided with a plurality of apertures, in a simple embodiment an uninflatable region with a single aperture could be provided. However, embodiments with a plurality of apertures provide a superior performance, minimising undesirable distortion of the inflatable element when it is inflated.

In the described embodiments the uninflated regions are formed integrally with the rest of the inflatable element, and then the apertures are formed. In another embodiment, the inflatable parts of the inflatable element and the uninflatable parts may be manufactured separately, finally being assembled to form an inflatable element equivalent to that described above.

In the present specification "comprise" means "includes or contains" and "comprising" means "including or containing".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An air-bag arrangement in the form of an inflatable curtain adapted to be mounted in a motor vehicle and adapted, when inflated, to extend adjacent the side windows of the motor vehicle, the air-bag arrangement including an inflatable element having an upper edge including means to mount the upper edge to a roof of the motor vehicle, and an opposed lower edge having opposed ends and including, means to connect the opposed ends to anchoring points within the motor vehicle, the lower edge of the inflatable element having between the anchoring points at least one inflatable region and at least one uninflatable region, the uninflatable region including at least one aperture therein, wherein on inflation of the inflatable element, the width of the at least one aperture will increase to moderate the tension generated between the anchoring points by the inflation of the inflatable region.

2. An air-bag arrangement according to claim 1 wherein there are at least two inflatable regions separated by a said uninflatable region.

3. An air-bag arrangement according to claim 1 wherein a gas flow duct is defined adjacent the upper edge of the inflatable element, and the gas flow duct communicates with the inflatable regions, each of which extends from the gas flow duct towards the lower edge of the inflatable element, at least one inflatable region being divided into a plurality of inflatable cells by seams provided within each inflatable region.

4. An air-bag arrangement according to claim 1 wherein the inflatable element has three inflatable regions, and two uninflatable regions for separating the three inflatable regions, each of the inflatable regions being provided with said at least one aperture.

5. An air-bag arrangement according to claim 1 wherein the inflatable element has an uninflatable region located between an inflatable part of the lower edge and at least one of the anchoring points.

6. An air-bag arrangement according to claim 5 wherein respective uninflatable regions are located between a main part of the lower edge and a respective one of two anchoring points.

7. An air-bag arrangement according to claim 1 wherein the uninflatable region is provided with a plurality of apertures.

8. An air-bag arrangement according to claim 7 wherein the plurality of apertures are provided in a plurality of rows of apertures, at least one row of apertures extending adjacent and parallel with the lower edge of the inflatable element, and another row of apertures extending at a location between the at least one row of apertures extending adjacent and parallel with the lower edge of the inflatable element and the upper edge of the inflatable element.

9. An air-bag arrangement according to claim 7 wherein the number of apertures present in the row of apertures extending adjacent and parallel with the lower edge of the inflatable element is greater than the number of apertures present in the another row of apertures.

10. An air-bag arrangement according to claim 7 wherein the apertures are oval apertures.

11. An air-bag arrangement according to claim 7 wherein the apertures are zig-zag apertures.

12. A method of making an inflatable element of an air-bag arrangement according to claim 1 wherein the method comprises the steps of using a one-piece weaving process to fabricate the inflatable curtain, and a laser cutting process to cut the at least one aperture.

* * * * *